United States Patent [19]
Nathans
[11] 4,357,659
[45] Nov. 2, 1982

[54] ROULETTE BETTING CALCULATOR

[76] Inventor: Robert L. Nathans, 36 Stag Dr., Billerica, Mass. 01821

[21] Appl. No.: 84,676
[22] Filed: Oct. 15, 1979
[51] Int. Cl.[3] .............................................. G06F 15/28
[52] U.S. Cl. .............................. 364/412; 235/92 GA; 273/138 A; 273/148 R; 364/569
[58] Field of Search ................................ 364/410-412, 364/565, 569; 273/138 R, 138 A, 142 R, 142 E, 142 HA, 148 R, 1 ES; 340/323 R; 235/92 GA, 92 T, 92 TS, 92 TA, 92 AE, 92 DN; 73/488-490

[56] References Cited

U.S. PATENT DOCUMENTS

| | | | |
|---|---|---|---|
| 2,652,977 | 9/1953 | Levy | 235/92 TA |
| 3,770,269 | 11/1973 | Elder | 273/138 A |
| 3,795,907 | 3/1974 | Edwards | 235/92 TA |
| 3,810,627 | 5/1974 | Levy | 235/92 TA |
| 3,819,186 | 6/1974 | Hinterstocker | 273/138 A |
| 4,052,073 | 10/1977 | Miller | 273/148 R |
| 4,060,242 | 11/1977 | Huang et al. | 235/92 GA |
| 4,281,239 | 7/1981 | Coon et al. | 235/92 GA |

*Primary Examiner*—Errol A. Krass
*Attorney, Agent, or Firm*—Robert L. Nathans; Homer O. Blair; Gerald H. Glanzman

[57] ABSTRACT

A small roulette calculator is provided, which may be carried in the pocket of a player, to indicate to the player when certain bet patterns, easily memorized by the player are favorable, which patterns occupy major segments of the wheel being targeted, e.g., half of the wheel. The relative velocity between the spinning ball and the rotating wheel head is measured early in the roll and the measured relative velocity data is converted into favorable bet indicating data by programming the calculator in accordance with empirical data derived by operation of a standard size roulette wheel. Compensation is also provided for preventing changes in the direction of the rolling of the ball from thwarting the operation of the calculator.

19 Claims, 6 Drawing Figures

ROULETTE BETTING CALCULATOR

BACKGROUND OF THE INVENTION

The game of roulette as played in casinos in the United States is very unfavorable to the player, owing to the two green 0-00 house numbers on the wheel. Accordingly, players who love roulette usually lose, particularly if they play for very long periods of time. Prior attempts to overcome this 5-5/19% disadvantage such as employing various betting progressions or the detection of an imperfect wheel, have generally failed, since the house edge is the same, regardless of how the money is bet, and additionally, imperfect wheels are now virtually non-existent in major casinos.

An object of the present invention is to provide a calculator which may be carried in pocket of the player, which is fairly simple to operate, and which will give the player at least a "figting chance" against the house by targeting typically half of the wheel.

More specifically, the calculator will produce a few favorable bet indicating signals, e.g., four, each of which would be associated with an easily remembered betting pattern, such as: bet the numbers one, three, five, seven and nine or two, four, six, eight, ten or second column numbers.

In a shuffle board game, if the puck leaves the start line at a relatively fast velocity, the puck will overshoot a target number; and, conversely, if the puck leaves the start line at a relatively slow velocity, the puck will not reach the target number. If the velocity of the puck is measured at a predetermined point, the approximate target portion may be ascertained.

In the game of roulette, the wheel head or spinner containing the pocketed numbers is rotated slowly counter clockwise while the ball is spun clockwise in the outer rim of the basin or stationary bowl containing the wheel head. The ball spins about the rotating wheel head a number of times and is slowed down by the frictional opposing force in the rim until the ball is pulled by gravity down into the wheel head to finally land in a particular pocket. Before this occurs, the ball hits one of eight breakers imbedded in the sloping portion of the bowl, and such breakers produce random motion of the ball usually in a forward direction, but sometimes in a reverse direction. I have discovered that surprisingly, the disruptive action of the breakers is not of sufficient magnitude as to defeat estimating which half or at least three fourths of the wheel head the ball will finally land in in accordance with the present invention.

SUMMARY OF THE INVENTION

In accordance with certain embodiments of the present invention, a small electronic calculating device is constructed to estimate the velocity of the ball relative to the moving wheel head at some predetermined portion thereof. Early in the spinning process or roll, a button is depressed when the ball passes the readily visible green zero, and the button is again depressed when the ball later passes the green zero. This indicates the relative velocity between the moving ball and wheel head early in the roll, and transducer means are actuated to indicate to the player a group of favorable bets, within typically, one half of the target wheel sector. Ball direction reversal compensation means are also provided.

DETAILED DESCRIPTION

Figure 1:
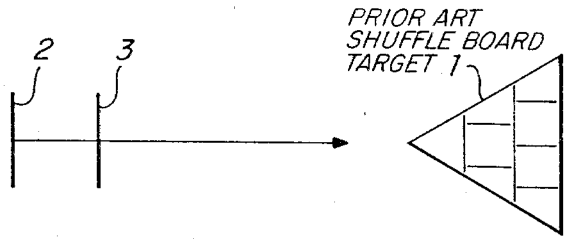
FIG. 1 illustrates a prior art shuffle board target.

FIG. 1 illustrates a target 1 of a shuffle board, together with base line 2 and another datum line 3. A timer could be actuated when the puck crosses line 2 and deactuated when the puck crosses line 3, and since the distance between lines 2 and 3 is fixed, the average velocity of the puck may be calculated.

Figure 2:
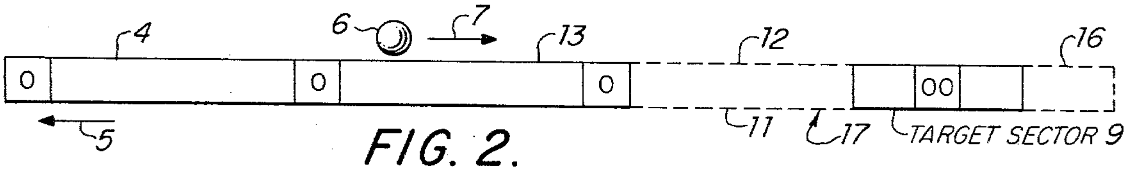
FIG. 2 schematically illustrates a basic concept which is helpful to understand the operation of the present invention.

In FIG. 2, each 360° of the wheel head is represented by a segment such as 4. The ball 6 may be visualized as moving in the opposite direction represented by arrow 7. A half wheel target sector 9 is illustrated connected by dotted lines 11 and 12 to segment 13. Unlike the shuffle board setup, the "ground" or deck is moving to the left, but since we are only concerned with the relatively velocity between the ball and the wheel head, this is of no concern. The empirical data, explained below, enables the transfer control means or logic circuitry to respond to the measured relative velocity so as to estimate the proper target sector, typically, half of the wheel. A somewhat higher relative velocity would indicate that the target sector 16 which is "beyond" the target sector 9, should be the target; and conversely, a slower relative velocity would indicate a "closer" target sector represented by 17 in FIG. 2.

Surprisingly, the action of the breakers fastened to the sides of the bowl surrounding the wheel, in kicking the ball about in a random fashion as it falls out of the rim is not sufficient to overcome predicting large wheel head target sectors for at least a significant number of rolls.

In "Roulette for the Millions,"0 by Patrick O'Neill-Dunn, Henry Regnery Co., 1971, the winning numbers for all spins on a standard size wheel in the Asian "Casino de Macao" over a thirty-day period are illustrated on thiry wheel charts; see pages 110-173. This empirical data indicates that for 500-700 spins per day, there is a fairly equal distribution of the winning numbers around the wheel head.

The following experiment was successful in demonstrating that within a narrow time interval, targeting of one-half of the wheel is feasible regardless of the breakers. A full size roulette wheel, accurately levelled with a carpenter's level, and having a 22-inch diameter wheel head (spinner) and having eight conventionally shaped breakers, and other components, was experimented upon with the spinner stationary. The ball raceway (inner rim) diameter was about 28 inches across.

Figure 3:
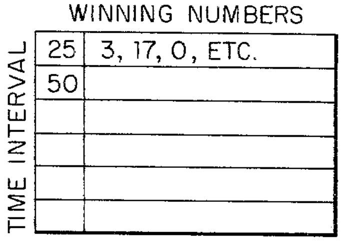
FIG. 3 illustrates the data sheet which is used to program the calculator.

An electronic stopwatch, accurate to one one-hundreths of a second, was employed. After the ball spun around the bowl one or two times, the stopwatch was pushed as the ball crossed the green 0 pocket and was again pushed as the ball crossed the green 0 pocket the next time. A matrix table of 586 winning numbers illustrated in FIG. 3 was set up, and the winning numbers were recorded along side of the associated measured rounded off time intervals, which time intervals are inversely proportional to the relative velocity between the ball and the wheel. The winning numbers were thereafter marked on a series of diagrams of an actual American wheel head, each diagram corresponding to a row of data or elapsed time interval shown in FIG. 3.

In other words, a wheel head diagram of 150 hundreths of a second was marked with the winning numbers that were produced in accordance with an elapsed time of 150 hundreths of a second. The next diagram labelled 155 hundreths of a second was similarly marked and so on, up to the last diagram of 210 hundreths of a second. Unlike winning number data illustrated on pages 110 through 173 of "Roulette for the Millions," examination of these diagrams indicated that the lower portion of the wheel received many more winning numbers than the upper portion. The term lower portion as used herein means the half of the wheel extending counterclockwise between, and including, number thirty-three and up to and including the number fifteen. The term upper portion includes the remaining half of the wheel. The rolls examined were confined to those winning numbers occurring within a time slot or window of 60 hundreths of a second, (the window between 150 and 210 hundreths of a second) so that winning numbers on each individual wheel diagram were added up to produce a composite wheel diagram of the total 586 rolls within this time interval. The winning numbers in the lower wheel portion were 362 out of a total of 586 rolls; these numbers include the green 0 and 00.

Subtracting 362 from 586 indicates that 224 winning numbers were in the upper wheel portion. If during a repeat of this experiment one were betting on all of the numbers, including the 00, in the lower portion, there would thus be 138 net wins out of 586 rolls (362−224), which indicates a theoretical player advantage of 23.5% (138 divided by 586). This is in sharp contrast to over a 5% disadvantage.

In accordance with a second experiment, the distribution of winning numbers was examined during the neighboring time interval between 85 hundreths and 145 hundreths of a second, or a second window of 0.6 seconds. As anticipated, a larger share of winning numbers were distributed in the upper wheel portion, rather than the lower portion as was the case with the first experiment having lower relative velocities. In other words, the target sector was moved 180° about the wheel head due to the faster relative velocity between the ball and wheel head. In the second experiment, out of a total of 558 rolls within this time window, 362 winning numbers (coincidentally) were in the upper portion and only 196 were in the lower portion. Thus, the net wins, if one were betting on all upper portion numbers, including 0, is 166 (362−196) for a theoretical player advantage of 29.9% (166/558). It is interesting to note that this latter figure is in the neighborhood of 23.5%, which confirms the statistical validity of these experiments.

Thus, the calculator would be programmed merely to tell the player that a substantial portion of, for example, the lower wheel portion is being targetted assuming a measured time interval of 150–210 hundreths of a second in actual casino play. With this information, the player would not bet all of the numbers, but could bet a pattern of numbers he memorized that would fall within the lower wheel portion. For example, since all of the numbers in the third column on the numbered roulette layout, except for 9 and 30, are in the lower wheel portion, he could bet at least some third column numbers nearer the wheel, which is easy to remember, excluding 9, which is not present in the lower portion, but including the double 0 which is also easy to remember. If desired, he could also remember to bet the 1, 8, 10, and 19, which are also in the lower wheel portion. The use of the term "third column" transducer below is intended to mean this betting pattern, rather than literally all third column numbers. In like manner, if the measured time interval indicates favorable targeting of the upper wheel portion as defined above, the player would bet some of the middle or second column numbers, excluding the number 8, which is not in the upper wheel portion, but including the green 0, which is in the upper portion. This pattern is also easy to remember. He could, if desired, also memorize that the numbers 2, 4, 5, 7, and 9 would also be favorable.

Furthermore, if the measured time interval indicates favorable targeting of the right half of the wheel, that is those numbers to the right of a vertical line commencing at the 0 (in the 12 o'clock position) and terminating at the double 0, he would merely remember to bet 1, 3, 5, 7, and 9, which is distributed in this right hand wheel sector. Conversely, he would bet 2, 4, 6, 8 and 10 should the measured time interval indicate favorable targetting of the left hand wheel portion. Should intermediate target sectors be indicated, the calculator could produce a no-bet output signal unless the estimated target sector covered a substantial portion of the four abovementioned major sectors of the wheel.

Thus, an important object of the invention is to produce a relatively few number of bet indicating signals, each of which the player could associate with a readily remembered betting pattern.

Figure 4:
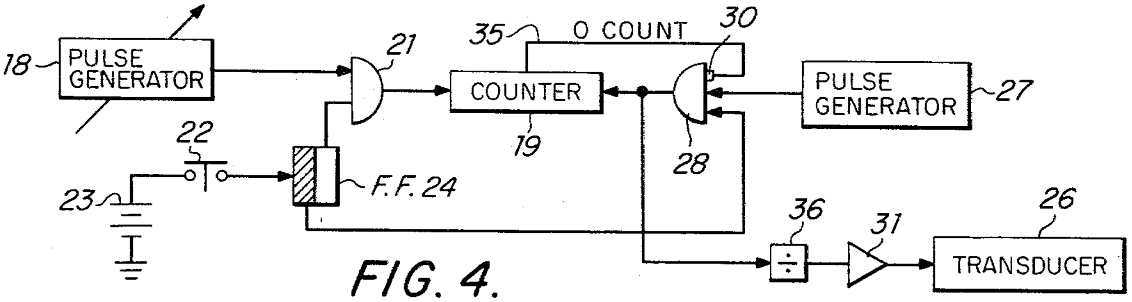
FIGS. 4, 5 and 6 illustrates various embodiments of the invention.

FIG. 4 illustrates a first embodiment of the invention. A variable frequency clock pulse generator 18 is coupled to a pulse counter 19 via AND gate 21. A pushbutton switch 22 coupled to voltage source 23 is also coupled to flip-flop 24 as indicated. The player first presses button 22 when the ball crosses the green 0 early in the roll, AND gate 21 is enabled by the actuation of flip-flop 24 and pulses are inputed to counter 19. When the ball again crosses the zero the second (or third) time, button 22 is again pressed, and the flip-flop 24, which was formerly set, becomes reset so that gate 21 no longer sends pulses to counter 19. In this embodiment, the player is instructed that a first pattern of bets is made if output transducer 26 produces one thump. When the transducer produces two thumps, he learns to make a different pattern of bets, and so on. As will be seen, the number of thumps produced by transducer 26 will be proportional to the count within counter 19, which in turn is inversely proportional to the relative velocity of the ball with respect to the rotating wheel head at some point early in the roll. After the second pressing of button 22, the count in the counter will now be counted down until a zero value is reached, and the number of pulses required for counting down the counter will produce a proportional number of thumps in transducer 26.

In actual casino play, the elapsed time with a standard wheel between the first ball-0 crossover point and the second crossover point is often about 25 to 150 hundreths of a second ($\frac{1}{4}$ to $1\frac{1}{2}$ seconds). I have found that it is less tedious and more accurate to estimate the time between the instant when the ball crosses the green 0 the first time and the instant the ball crosses the green 0 the third time, rather than the second time. In this case, the measured range of elapsed time could be 50 to 300 hundreths of a second. The above-described experiment indicates that within certain measured time intervals, e.g. 60 hundreths of a second, target estimate variations within such intervals are not of major importance when major segments of the wheel are being targetted. Thus, the time slots, or windows, of 25 or perhaps 50 hundreths of a second or more, each of which produces a particular bet indication, should generally suffice.

Let it be assumed that the count in counter 19 of FIG. 4 is between 150 and 175 hundreths of a second. Flip-flop 24 becomes reset due to the second actuation of pushbutton 22, which disables AND gate 21. Pulse generator 27, which may have the same frequency of pulse generator 18, produces pulses which pass through enabled AND gate 28 to count down the count in counter 19 until a zero or some other count is registered, wherein a signal is produced on lead 35 to cause inhibit terminal 30 to disable AND gate 28. It is an important feature of the invention to provide a frequency divider 36 which could, for example, divide the pulse train passing through AND age 28 by twenty-five, thereby to apply a pulse to amplifier 31, for each count-down representing a 25 hundreths of a second time sub-interval or sub-slot. Where a count of 150 hundreths of a second is counted down to 0, six pulses would be applied to transducer 26. This indicates that the measured time interval is between 150 and 175 hundreths of a second.

The use of a frequency divider produces a low and thus, managable number of pulses for bet indication purposes. The relatively high frequency of pulse generator 18 maintains accuracy in measuring the time interval. Transducer 26 could take many forms, and is preferably configured to produce mechanical impulses or "thumps" which may be detected by the player's fingertips or other parts of the body. As explained previously, he thereafter uses this information to place a particular pattern of bets.

Figure 5:
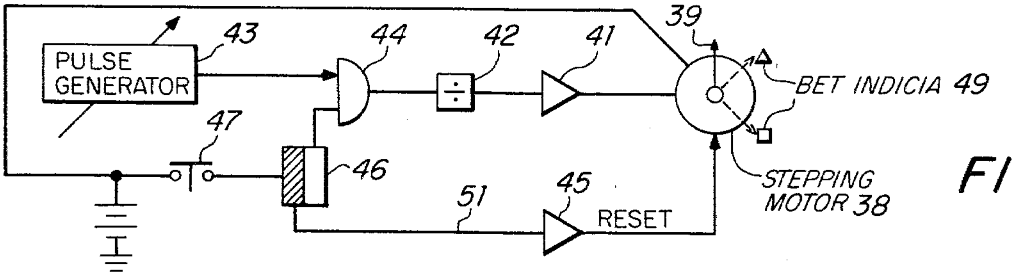

The embodiment of FIG. 5 illustrates a transducer in the form of stepping motor 38 for actuating a movable member such as pointer 39 coupled to the output shaft of motor 38. Should the time interval establishing means indicate a 150–175 hundreths of a second measured time interval, 6 pulses would be applied to stepping motor 38 by amplifier 41 in the event that frequency divider 42 divides by 25, as in the first embodiment. Pulse generator 43, AND gate 44, flip-flop 46, and pushbutton 47 all function in a similar manner as described above. Where pulse generator 43 generates 100 pulses per second, the frequency divider 42 in this example would step the movable pointer member 39 six steps. When pushbutton 47 causes flip-flop 46 to reset, a pulse is applied to amplifier 49 via lead 51 to reset the stepping motor. Bet indicating means 49 could merely take the form of a "clock hand" or pointer alone, or could take the form of raised triangles, squares, circles, vertical lines, horizontal lines, etc., so that the player could sense with his fingertips the shape of the indicia adjacent pointer 39, each shape being mentally associated with a betting pattern. Alternatively, the pointer could be eliminated, and a disk bearing bet indicia 49 could be rotated by the stepping motor to sequentially position the various indicia at a predetermined point on the surface of the calculator. The stepping motor could merely consist of a solenoid driven pawl and ratchet.

Figure 6:
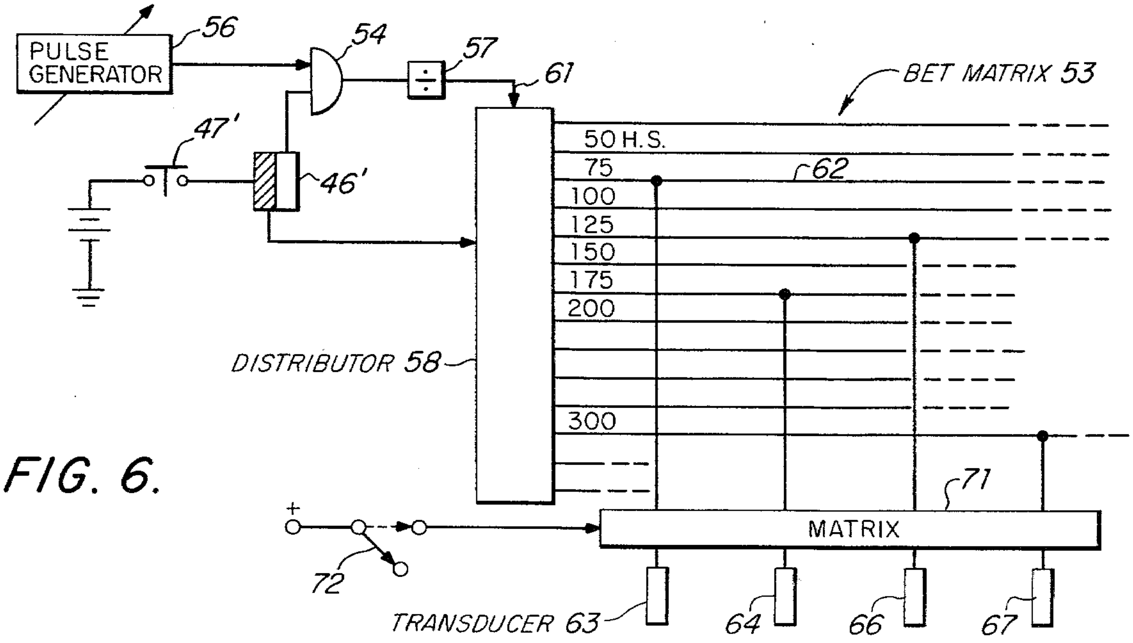

In the embodiment of FIG. 6, logic circuitry or bet matrix is employed for translating the measured count into a signal produced on one or more of a plurality of output circuits. Now, let it be assumed that the measured time interval is between 75 and 100 hundreths of a second. AND gate 54 will cause pulses produced by pulse generator 56 to be counted down by frequency divider 57. Since the measured time interval is between 75 and 100 hundreths of a second, three pulses will be applied to distributor, or commutator 58 via lead 61, and the third horizontal lead 62 of bet matrix 53 will be energized. This action in turn could, for example, energize "third column" transducer 63 to indicate to the player that a betting pattern involving "third column " numbers, the double zero which is easy to remember, and, if desired, 1, 8, and 10, but not 9, should be bet as previously explained. If the measured time interval is between, for example, 175 and 200 hundreths of a second, a "second column" transducer 64 will be energized in like manner, and the player would bet "second column" numbers, zero, and if desired, 4, 7, and 9, but not 8.

In like manner, should transducer 66 be energized, this would indicate to the player to bet the numbers in the right half of the wheel where the green 0 is at 12 o'clock, such numbers being 1, 3, 5, 7 and 9, which may be easily memorized. Should transducer 67 be energized, the player will easily remember to bet the numbers two, four, six, eight, and ten, which are located in the left hand portion of the wheel head. As is well understood by those skilled in the electronics art, the logic circuitry could take many forms. For example, a binary counter could address in parallel a binary-decimal conversion matrix which could energize a horizontal lead in bet matrix 53. Such structure could be substituted for distributor 68. One of a number of programmable memories could be selectively addressed, rather than employing an actual matrix. In other words, the logic circuitry may be viewed as a bet dictionary or look-up device for converting measured time interval data into bet indicating data.

CHANGE IN DIRECTION OF BALL THROW COMPENSATION

As discussed above, the straightforward programming of the calculator assumes that the wheel head is rotating counterclockwise and the ball is rotating clockwise as is customary. As discussed previously, a particular measured time interval will indicate favorable betting of the numbers in the right-hand portion of the wheel. Now let it be assumed that the roulette dealer rotates the wheel head clockwise and the ball counter clockwise. Such action would produce an erroneous favorable betting indication in this example, since the left-hand portion should be targeted rather than the right-hand portion, thereby to "mirror image" the centroid of the target sector with respect to the above-mentioned Y axis passing through the green 0 and 00. A change in ball direction compensation means is thus provided to rapidly change or "mirror image" the indicated target sectors associated with particular time intervals and such compensation means could take many forms. For example, in FIG. 6 a scrambling matrix 71, similar to a code decipher device or a binary code translator, could be inserted between the bet matrix 53 and the output transducers as shown. Such a scrambling matrix could be constructed to properly switch the connections between the transducers and the various matrix cross points in accordance with empirical data derived from operating the standard wheel in the unconventional manner where the ball is rotated counterclockwise and the wheel head clockwise. For normal operation, a ball direction change input device or switch 72 would assume the inactive position shown in FIG. 6, so that the matrix is not actuated to perform the above-mentioned scrambling and thus, for example, lead 62 of matrix 53 would be directly connected to transducer 63, etc. Should the player observe that the dealer starts to rotate the wheel head clockwise rather than counteclockwise, as is the normal custom, switch 72 is immediately actuated to in turn cause matrix 71 to scramble the output leads from matrix 53 thereby to thwart the effect of changing the direction of the throw of the ball. In FIG. 5, the actuation of a switch similar to 72 could cause the motor 38 to receive an additional number of pulses which in turn would cause the stepping motor to rotate in this example an additional 180 degrees, thereby to "mirror image" the target centroid. In FIGS. 4 or 6 additional pulses could be applied to counter 19 to change the count therein to produce this result. In contrast, little if any compensation is required for targeting upper/lower segments. In the FIG. 4 embodiment, and for that matter in the other embodiments, the switch need not be provided at all and the player could learn to memorize a second set of different betting patterns, should he observe that the direction of the wheel head and throw of the ball is reversed.

In summary, time interval establishing means are provided for producing signals which are applied to various transducer means via transducer control means. It is preferable that the transducer take the form of devices for converting electrical signals to mechanical impulses such as tiny relays. However, any transducer means such as liquid crystal or LED devices, sonic devices, or possibly even thermal devices may be employed. Thus, the invention teaches a practical method of giving the player a "fighting chance" or better against the house. The calculator may be wrist mounted or readily kept in the player's pocket so as not to be conspicuous.

The use of these various calculators would require a certain amount of skill on the part of the player so that the results probably will vary considerably. For example, there is a minor amount of skill in "eyeballing" the ball-wheel crossover points for establishing the timing interval. The results for relatively short periods of play would also vary widely, since all of the numbers in a target wheel sector would not be bet.

It is to be understood that the above-described embodiments are merely examples of how the invention may be implemented, and that the invention is to be limited only by the permissable scope of the following claims, including all equivalents. It is also contemplated that an actual numerical readout of recommended bets or half wheel target sectors may be provided through the use of, for example, LED or liquid crystal devices. Additionally, the above-mentioned programmable memories could be temporarily cleared, and an ambitious player could calibrate the wheel by loading the memories with the winning numbers during casino play, thereby to input the calculator with data in accordance with the table of FIG. 3. The calculator could be programmed to examine the winning numbers stored in the memory for each particular timing interval, and could calculate the target wheel sector portion through the use of an arithmatic logic unit. It may be noted that many retired people, having lots of time, may be attracted to this approach.

It is also within the scope of the invention that the time interval may be terminated when the ball passes a different particular portion of the wheel than that portion which initiated the measured time interval. For example, the green 00 rather than the green 0 could define the second registered ball wheel crossover point.

I claim:

1. A roulette betting calculator for indicating favorable bets during the operation of a roulette wheel having a wheel head with target indicia thereon and means associated with said wheel head for containing a spinning ball comprising:

a. time interval establishing means for producing time interval data proportional to the time interval between a first instant said ball passes by a first particular portion of said wheel head and a later instant when said ball passes by a second particular portion of said wheel head; and b. bet indicating means responsive to said time interval data for producing favorable bet indicating information which is a function of the value of said time interval data.

2. The combination as set forth in claim 1 wherein said bet indicating means includes transducer means and transducer control means coupled between said time interval establishing means and said transducer means for activating said transducer means in accordance with the value of the data produced by said time interval establishing means.

3. The combination as set forth in claim 2 wherein said transducer control means further includes means for changing the count within said time interval establishing means until a given value is reached and for applying an impulse to said transducer means when said count is changed by a predetermined amount as the count is changed in a direction toward said given value.

4. The combination as set forth in claim 2 wherein said transducer means includes a stepping motor for actuating a movable member, the final position of said movable member indicating a bet recommendation.

5. The combination as set forth in claim 4 further including a frequency divider coupled to said stepping motor.

6. The combination as set forth in claim 4 wherein said movable member has bet indicating symbols associated therewith configured to be sensed by the skin of the player.

7. The combination as set forth in claim 2 wherein said transducer means converts an electrical signal into a mechanical signal capable of being sensed by the skin of the player.

8. The combination as set forth in claim 7 wherein said transducer control means activates said transducer means a number of times, depending upon the value of said time interval data.

9. The combination as set forth in claim 8 further including a frequency divider coupled to said transducer means.

10. The combination as set forth in claim 1 wherein said bet indicating means includes logic means having a plurality of output circuits for producing an output signal on selected ones of said output circuits, depending upon the value of said time interval data produced by said time interval establishing means, and transducer means coupled to said output circuits of said logic means for communicating bet indicating information to the player.

11. The combination as set forth in claim 10 wherein said transducer means comprises a plurality of discrete transducers, together with means for coupling each transducer to an associated output circuit.

12. The combination as set forth in claim 11 wherein said discrete transducers are configured to produce mechanical impulses detectable by the skin of the player.

13. The combination as set forth in claim 1 wherein said first and second particular portions of said wheel head are the same portion.

14. The combination as set forth in claim 1, 4, 8 or 9 wherein said time interval establishing means further comprises a pulse generator, counting means, and means for coupling said counting means to said pulse generator for a time proportional to said time interval.

15. The combination as set forth in claim 14 wherein said coupling means further comprises a gate, and switch means for opening said gate for coupling said pulse generator to said counting means upon a first actuation of said switch means and for closing said gate upon a subsequent actuation of said switch means.

16. A roulette betting calculator for indicating favorable bets during the operation of a roulette wheel having a wheel head with target indicia thereon and means associated with said wheel head for containing a moving ball comprising:

a. means for establishing a first instant in time when said ball passes a first particular portion of said wheel head and for establishing a second later instant in time when said ball passes a second particular portion of said wheel head;

b. time interval establishing means for producing an indication of the time period between said first instant and said second instant; and c. bet indicating means for producing a bet indication which is a function of said time period established by said time interval establishing means.

17. The combination as set forth in claim 16 further including a ball direction change input means, together with a change in ball direction compensation means coupled to said ball direction change input means for altering at least some of said favorable bet indicating information in response to the actuation of said ball direction change input means.

18. The combination as set forth in claim 16 or 17 wherein at least one of said first and second particular portions of said wheel head is marked in a color which provides visual contrast with respect to the coloring of the major portion of said wheel head during the rotation thereof.

19. The combination as set forth in claim 16 wherein said first and second particular portions of said wheel head are the same portion.

* * * * *